United States Patent
Lee et al.

(10) Patent No.: US 8,462,246 B2
(45) Date of Patent: Jun. 11, 2013

(54) APPARATUS AND METHOD FOR CDS AND ADC WITH MULTIPLE SAMPLINGS IN IMAGE SENSOR

(75) Inventors: Myoung-Su Lee, Seoul (KR); June-Soo Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 11/899,677

(22) Filed: Sep. 7, 2007

(65) Prior Publication Data

US 2008/0094494 A1   Apr. 24, 2008

(30) Foreign Application Priority Data

Sep. 8, 2006 (KR) .................................. 2006-86688

(51) Int. Cl.
- *H04N 3/14* (2006.01)
- *H04N 5/335* (2011.01)
- *H03M 1/00* (2006.01)
- *H03M 1/12* (2006.01)

(52) U.S. Cl.
USPC ........... 348/308; 348/294; 348/302; 341/122; 341/129; 341/155; 341/172

(58) Field of Classification Search
None
See application file for complete search history.

(56) References Cited

U.S. PATENT DOCUMENTS

| | | | |
|---|---|---|---|
| 6,850,278 B1 * | 2/2005 | Sakurai et al. | 348/302 |
| 2002/0122129 A1 * | 9/2002 | Lee | 348/308 |
| 2005/0206752 A1 | 9/2005 | Lim | |
| 2006/0012698 A1 * | 1/2006 | Nitta et al. | 348/308 |
| 2006/0170795 A1 * | 8/2006 | Higuchi et al. | 348/241 |
| 2007/0008206 A1 * | 1/2007 | Tooyama et al. | 341/155 |

OTHER PUBLICATIONS

Korean Patent Application No. 1019990024782 to Hong, having Publication date of Jan. 15, 2001 (w/ English Abstract page).
Korean Patent Application No. 1020040017675 to Lim, having Publication date of Sep. 22, 2005 (w/ English Abstract page).
Korean Patent Application No. 1020040082078 to Keel et al., having Publication date of Apr. 19, 2006 (w/ English Abstract page).
Japanese Patent Application No. 2005-073341 to Lim, having Publication date of Sep. 29, 2005 (w/ English Abstract page).
Japanese Patent Publication No. 2005-269471 to Matsumoto et al., having Publication date of Sep. 29, 2005 (w/ English Abstract page).
Japanese Patent Publication No. 2006-025189 to Kawahito, having Publication date of Jan. 26, 2006 (w/ English Abstract page).

* cited by examiner

*Primary Examiner* — Michael Osinski
(74) *Attorney, Agent, or Firm* — Monica H. Choi

(57) ABSTRACT

For analog to digital conversion with correlated double sampling in an image sensor, a pixel signal from a given pixel is sampled to generate a respective sampled signal N-times, with N>1 within a horizontal scan time period. A ramp signal is generated with a respective ramping portion for each respective sampled signal. Each respective sampled signal is compared with a respective ramping portion to generate a respective comparison signal that determines a respective digital code. The N respective digital codes are summed to generate a final digital code with reduced random noise.

16 Claims, 13 Drawing Sheets

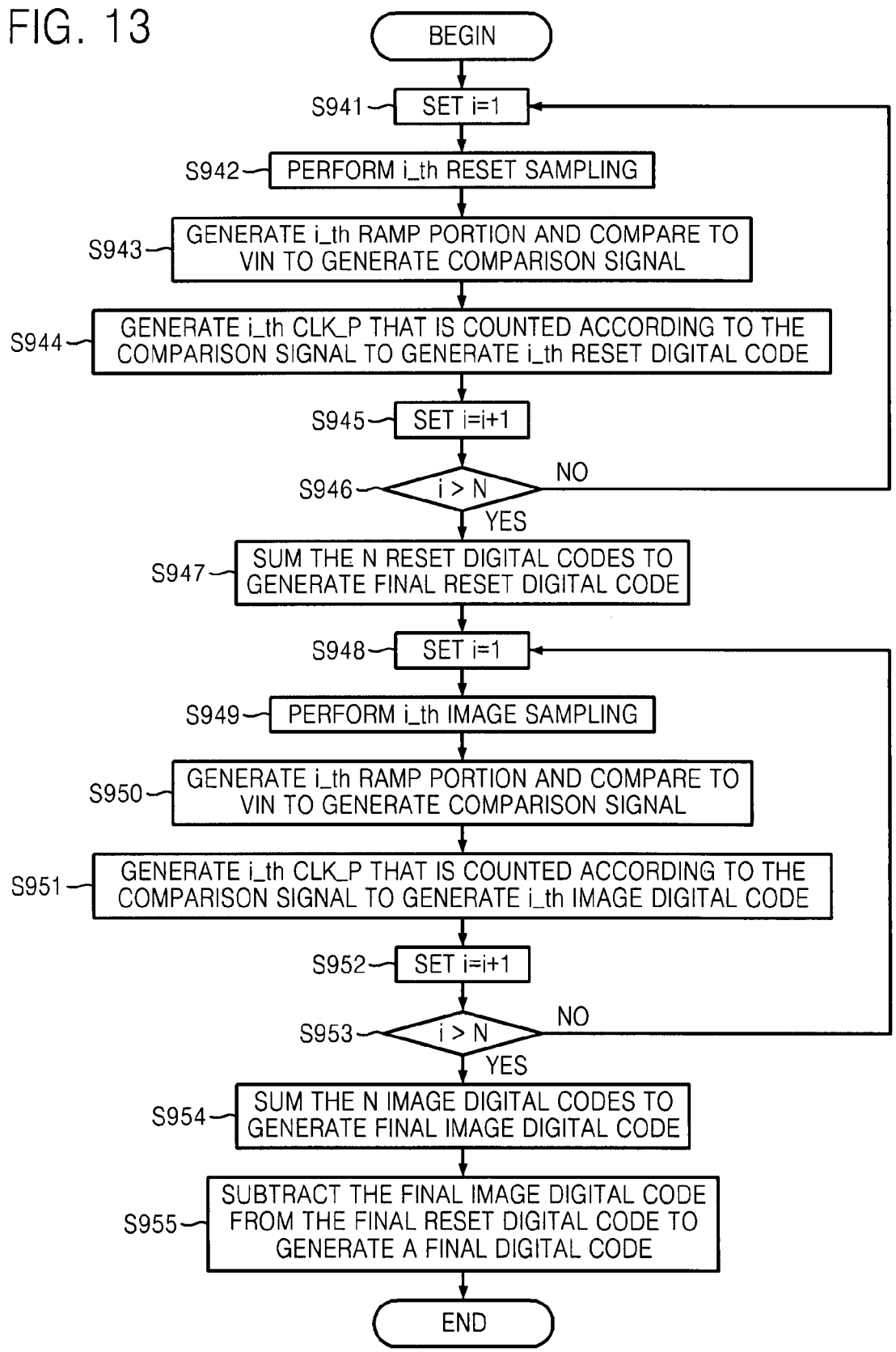

APPARATUS AND METHOD FOR CDS AND ADC WITH MULTIPLE SAMPLINGS IN IMAGE SENSOR

BACKGROUND OF THE INVENTION

This application claims priority under 35 USC §119 to Korean Patent Application No. 2006-86688, filed on Sep. 8, 2006 in the Korean Intellectual Property Office, the disclosure of which is incorporated herein in its entirety by reference.

1. FIELD OF THE INVENTION

The present invention relates generally to image sensors such as CMOS (complementary metal oxide semiconductor) image sensors, and more particularly, to using multiple samplings of a reset signal and an image signal from a pixel during a horizontal scan time period for ADC (analog to digital conversion) with CDS (correlated double sampling) to reduce random noise.

2. BACKGROUND OF THE INVENTION

An image sensor captures an image from photo-conversion of light by a semiconductor material. Charge coupled devices (CCD) are such an example of an image sensor. More recently, CMOS (complementary metal oxide semiconductor) image sensors using CMOS transistors have been rapidly developed for common use in electronic devices.

FIG. 1 is a block diagram of a conventional CMOS image sensor (CIS) 10. Referring to FIG. 1, the CIS 10 includes a pixel array 20, a timing control circuit 30, a row driver 40, and an ADC (analog to digital conversion) block 50. The pixel array 20 outputs pixel signals corresponding to a sensed image. The timing control circuit 30 generates timing control signals. The row driver 40 selects a row of the pixel array 20 generating pixels signals to be processed, based on the timing control signals.

The ADC block 50 receives from such a selected row the pixel signals that are analog signals for conversion to digital signals. The ADC block 50 also uses CDS (correlated double sampling) during such analog-to-digital conversion. CDS is widely used to detect only a desired signal component by removing fixed pattern noise (FPN) from a signal generated by a unit pixel of the pixel array 20. Such noise is removed in CDS that determines a difference between a reset signal and an image signal. The reset signal is generated by the unit pixel when a reset voltage is applied on the unit pixel, and the image signal is generated by the unit pixel from light received at the unit pixel.

FIG. 2 is a block diagram of an ADC unit of the ADC block 50 of FIG. 1 for processing pixel signals from a column of pixels in the pixel array 20. At any given time, the row driver selects a single pixel to generate the pixel signals to be processed by the unit ADC block 50 during a horizontal scan time period. Referring to FIG. 2, the ADC block 50 includes a CDS unit 210, a code generator 240, and a data bus 250.

The CDS unit 210 includes a sampling unit 220 and a comparison unit 230. The sampling unit 220 includes a switch 222 and a storing unit 224 which is a capacitor C1. The switch 222 transmits to the capacitor C1 a reset signal and an image signal as analog signals generated from the selected unit pixel. The capacitor 224 stores such sampled reset and image signals at a first node and has a predetermined ramp signal RAMP applied on a second node.

The comparison unit 230 includes a comparator 232 and an inverter 234. The comparator 232 has an input voltage VIN applied on a negative input and has a reference signal REF applied on a positive input. The ramp signal RAMP causes the input voltage VIN to ramp from the sampled reset voltage or the sampled input voltage.

In either case, the comparator 232 compares the input voltage VIN with the reference signal REF. As a result, the comparison unit 230 outputs a comparison signal CDS01 from the inverter 234 having a logic state depending on such a comparison by the comparator 232. A buffer or an amplifier may also be used in place of the inverter 234, and in that case, the logic state of the comparison signal CDS01 would be the reverse of the output of the inverter 234.

The code generator 240 counts edges of a clock signal CLK starting from activation of an enable signal CEN to generate a digital code, such as a gray code for example. The ramp signal RAMP starts to ramp also upon activation of the enable signal CEN.

The data bus 250 receives the comparison signal CDSO1 and the digital code (gray code) for latching such digital code at a logic transition of the comparison signal CDSO1. A reset digital code is thus generated when a reset signal is sampled by the sampling unit 220, and an image digital code is thus generated when an image signal is sampled by the sampling unit 220. The data bus 250 determines a difference between such reset and image digital codes to generate a final digital code CODE1 that corresponds to the image sensed by the unit pixel.

FIG. 3 is a timing diagram of signals during operation of the ADC block 50 of FIG. 2. Referring to FIGS. 1, 2, and 3, a horizontal scan time period is defined for processing pixel signals from a respective unit pixel of each row. The ADC block 50 in FIG. 1 includes a plurality of ADC units, each implemented similarly to FIG. 2 and each coupled to a respective column of the pixels of the pixel array 20. The row driver 40 selects a row having a corresponding unit pixel to generate the pixel signals to be processed by a corresponding ADC unit 50 during each horizontal scan time period.

Referring to FIG. 3, operation of the image sensor 10 is timed according to a clock signal CLK. At time point t1, the switch 222 is closed such that a reset signal Vres is sampled by the capacitor 224 (Reset Signal Sampling in FIG. 3) before the ramp signal RAMP begins to ramp. At time point t2, the switch 222 is opened, and the enable signal CEN is activated such that the ramp signal begins to ramp and such that the code generator 240 begins to count according to edges of the clock signal CLK.

As the ramp signal RAMP ramps up, the input voltage VIN also ramps up from the sampled reset voltage Vres. At time point t3, VIN becomes greater than the reference signal REF such that the comparison signal CDSO1 from the comparison unit 230 makes a logic transition from a low state ("0") to a high state ("1"). The data bus 250 latches the digital code generated by the code generator 240 as a result of counting the clock signal CLK from time point t2 to time point t3 as a reset digital code (code11 in FIG. 3).

Thereafter, the switch 222 is closed at time point t4 such that an image signal (Vres-Vsig) is sampled by the capacitor 224 while the ramp signal RAMP is at a constant low voltage. At time point t5, the switch 222 is opened for ending the sampling of the image signal, and the ramp signal RAMP begins to ramp up at another activation of the enable signal CEN. Also, the code generator 240 begins to count edges of the clock signal CLK according to such activation of the enable signal CEN. The input voltage VIN increases with such ramping of the ramp signal RAMP until the input voltage VIN becomes greater than the reference signal REF at time point t6. The comparison signal CDSO1 from the comparison unit 230 makes a logical transition at that time point t6. The data bus 250 latches the digital code generated by the code generator 240 as a result of counting the clock signal CLK from time point t5 to time point t6 as an image digital code (code12 in FIG. 3).

For correlated double sampling, the data bus 250 determines a difference between the image digital code and the reset digital code (code12-code11 in FIG. 3) to generate a final digital code CODE1 corresponding to image captured by the unit pixel. Such correlated double sampling eliminates the effects of fixed pattern noise in the pixel array 20. However, the CIS 10 also includes random noise in the pixel array 20 and the ADC block 50.

As pixel size is further minimized with advancement of CIS technology, a logic high signal is generated with an amplification ratio so that random noise increases. Such increased random noise may seriously degrade image quality in the CIS 10. Thus, a mechanism for eliminating the effects of such random noise is desired.

SUMMARY OF THE INVENTION

Accordingly in the present invention, multiple samples of the reset and image signals are processed for ADC (analog to digital conversion) with CDS (correlated double sampling) during a horizontal scan time period of an image sensor for reducing random noise.

A CDS and ADC method and apparatus in an image sensor includes according to an aspect of the present invention, a sampling unit, a ramp signal generator, a comparison unit, and a code generator. The sampling unit samples a pixel signal from a given pixel to generate a respective sampled signal N-times, with N>1 within a horizontal scan time period of the image sensor. The ramp signal generator generates a ramp signal with a respective ramping portion for each respective sampled signal. The comparison block compares each respective sampled signal with a respective ramping portion to generate a respective comparison signal. The code generator generates a respective digital code from each respective comparison signal.

In an example embodiment of the present invention, each respective ramping portion has a slope that is increased according to N from an initial slope of a predetermined ramp signal designed for sampling the pixel signal one-time during the horizontal scan time period.

In another embodiment of the present invention, a data bus sums together the N respective digital codes to generate a final digital code corresponding to the pixel signal.

In a further embodiment of the present invention, the code generator counts a respective clock signal from the respective ramping portion beginning to ramp until a logic transition of the respective comparison signal to generate the respective digital code for each respective sampled signal.

In another embodiment of the present invention, a phase shifter generates the N respective clock signals that are successively phase-shifted by 360°/N for the N respective sampled signals.

According to another aspect of the present invention, the sampling unit samples another pixel signal from the given pixel to generate another respective sampled signal N-times within the horizontal scan time period. In that case, the ramp signal generator generates the ramp signal with a respective ramping portion for each of the N other respective sampled signals, and the comparison block compares each of the N other respective sampled signals with a respective ramping portion to generate a respective comparison signal. The code generator generates a respective digital code from each respective comparison signal for each of the N other respective sampled signals.

For example, the pixel signal is a reset signal generated by the given pixel, and the other pixel signal is an image signal generated by the given pixel. Such an embodiment of the present invention may be used to particular advantage when the image sensor is a CMOS (complementary metal oxide semiconductor) image sensor.

In that case, the data bus sums the respective digital codes for the N respective sampled signals to generate a final reset digital code corresponding to the reset signal, and sums the respective digital codes for the N other respective sampled signals to generate a final image digital code corresponding to the image signal. Also in that case, the data bus determines a difference between the final image digital code and the final reset digital code to generate a final digital code with correlated double sampling.

In another embodiment of the present invention, the pixel signal is sampled N-times during a first half of the horizontal scan time period, and the other pixel signal is sampled N-times during a second half of the horizontal scan time period.

In a further embodiment of the present invention, multiple capacitors are alternately used for storing each of the N pixel signal samplings. In addition, each such sampling using one capacitor may overlap in time with analog to digital conversion of a prior sampling stored in another capacitor when such multiple capacitors are used.

In this manner, the reset and image signals are sampled multiple times, and the result of the CDS and ADC are summed together for reducing random noise. In addition, such multiple samplings and processing of such multiple samplings are performed within the horizontal scan time period for retaining speed performance of the image sensor.

BRIEF DESCRIPTION OF THE DRAWINGS

The above and other features and advantages of the present invention will become more apparent when described in detailed exemplary embodiments thereof with reference to the attached drawings in which:

FIG. 13 shows a flowchart of steps during operation with multiple samplings of the reset and image signals during a horizontal scan time period by the CDS and ADC apparatus of FIG. 4 or 6, according to an embodiment of the present invention.

The figures referred to herein are drawn for clarity of illustration and are not necessarily drawn to scale. Elements having the same reference number in FIGS. 1, 2, 3, 4, 5, 6, 7, 8, 9, 10, 11, 12, and 13 refer to elements having similar structure and/or function.

DETAILED DESCRIPTION OF THE INVENTION

Figure 4:
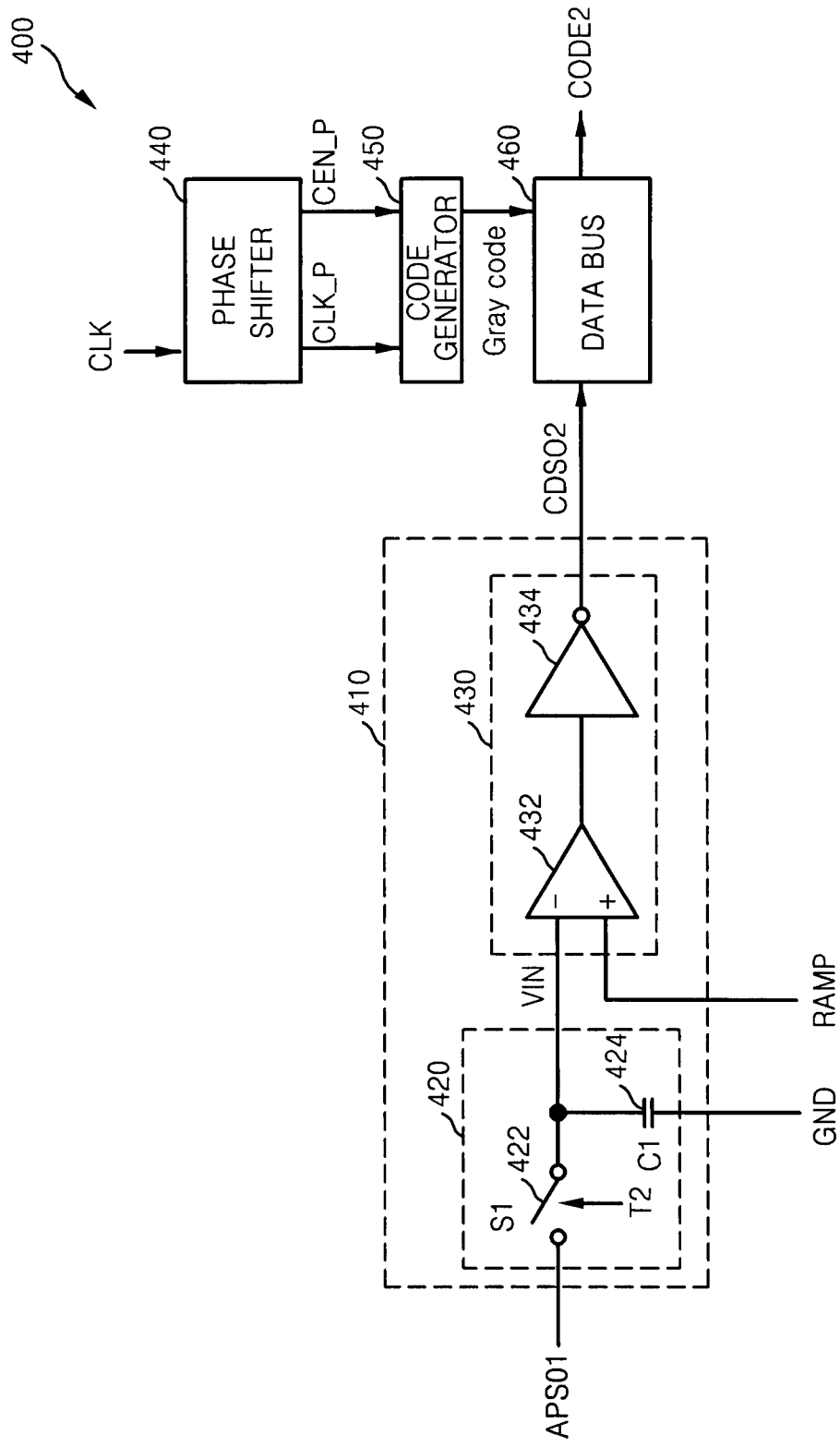
FIG. 4 is a block diagram of a CDS and ADC apparatus according to an embodiment of the present invention.

FIG. 4 is a block diagram of a CDS (correlated double sampling) and ADC (analog to digital converter) apparatus 400 according to an embodiment of the present invention. Referring to FIG. 4, the CDS and ADC apparatus 400 includes a CDS unit 410, a phase shifter 440, a code generator 450, and a data bus 460. The CDS unit 410 includes a sampling unit 420 and a comparison unit 430. The sampling unit 420 includes a switch 422 and a storing unit 424 that is a capacitor C1 in an embodiment of the present invention. The comparison unit 430 includes a comparator 432 and an inverter 434.

Figure 8:
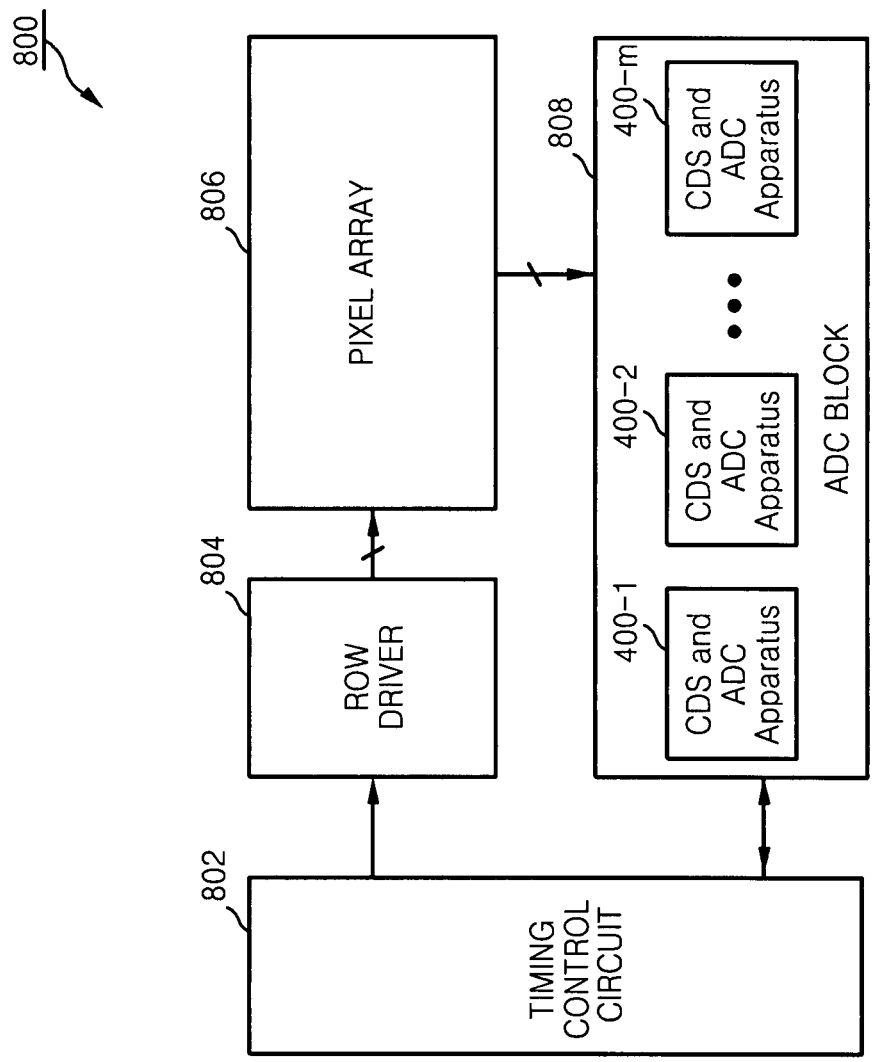
FIG. 8 is a block diagram of an image sensor including the CDS and ADC apparatus of FIG. 4 or 6, according to an embodiment of the present invention.

FIG. 8 shows an image sensor 800 including the CDS and ADC apparatus 400. The image sensor 800 includes a timing control circuit 802, a row driver 804, a pixel array 806, and an ADC (analog to digital converter) block 808. The row driver 804 selects a row of pixels in the pixel array 806 for generating pixel signals to be processed by the ADC block 808 in response to control signals from the timing control circuit 802.

The ADC block 808 includes a plurality of CDS and ADC apparatuses 400-1, 400-2, ..., and 400-m, each implemented similarly to the CDS and ADC apparatus 400 of FIG. 4. Each of the CDS and ADC apparatuses 400-1, 400-2, ..., and 400-m is coupled to a column of pixels of the pixel array 806. FIG. 8 shows an example of the pixel array 806 having m columns of pixels such that the ADC block 808 includes m CDS and ADC apparatuses 400-1, 400-2, ..., and 400-m.

Figure 9:
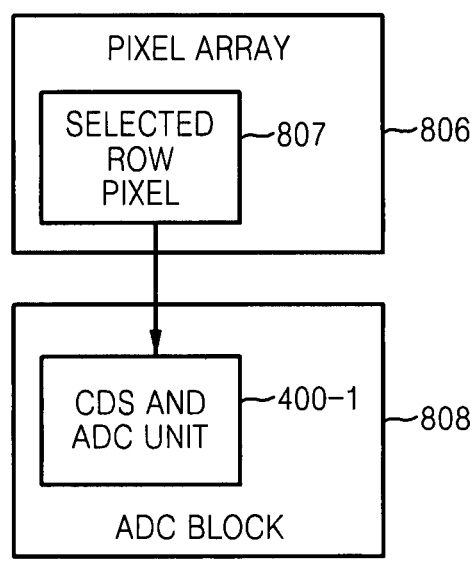
FIG. 9 is a block diagram illustrating an unit pixel of a selected row that generates pixels signals processed by the CDS and ADC apparatus of FIG. 4 or 6, according to an embodiment of the present invention.

The timing control circuit 802 generates control signals such that a selected row of pixels generates pixel signals to be processed by the CDS and ADC apparatuses 400-1, 400-2, ..., and 400-m during a horizontal scan time period. Thus, a respective unit pixel in such a selected row generates respective pixel signals to be processed for CDS (correlated double sampling) and ADC (analog to digital conversion) by each of the CDS and ADC apparatuses 400-1, 400-2, ..., and 400-m during a horizontal scan time period. For example, FIG. 9 shows a unit pixel 807 in the selected row that generates respective pixel signals to be processed by a corresponding CDS and ADC apparatus 400-1 during a horizontal scan time period.

The timing control circuit 802 controls the row driver 804 to select a respective row of pixels in the pixel array 806 to be coupled to the CDS and ADC apparatuses 400-1, 400-2, ..., and 400-m for each horizontal scan time period. Thus, the rows of pixels in the pixel array 806 are successively coupled to the CDS and ADC apparatuses 400-1, 400-2, ..., and 400-m for successive horizontal scan time periods.

Referring back to FIG. 4, a first terminal of the switch S1 is coupled to a node of the unit pixel generating the pixel signal APS01 and selected to be coupled to the CDS and ADC apparatus 400. A second terminal of the switch S1 is coupled to a first terminal of the capacitor 424 having a second terminal coupled to a ground node GND. The first terminal of the capacitor 424 generates a sampled input voltage VIN that is applied to a negative input of the comparator 430.

Figure 10:
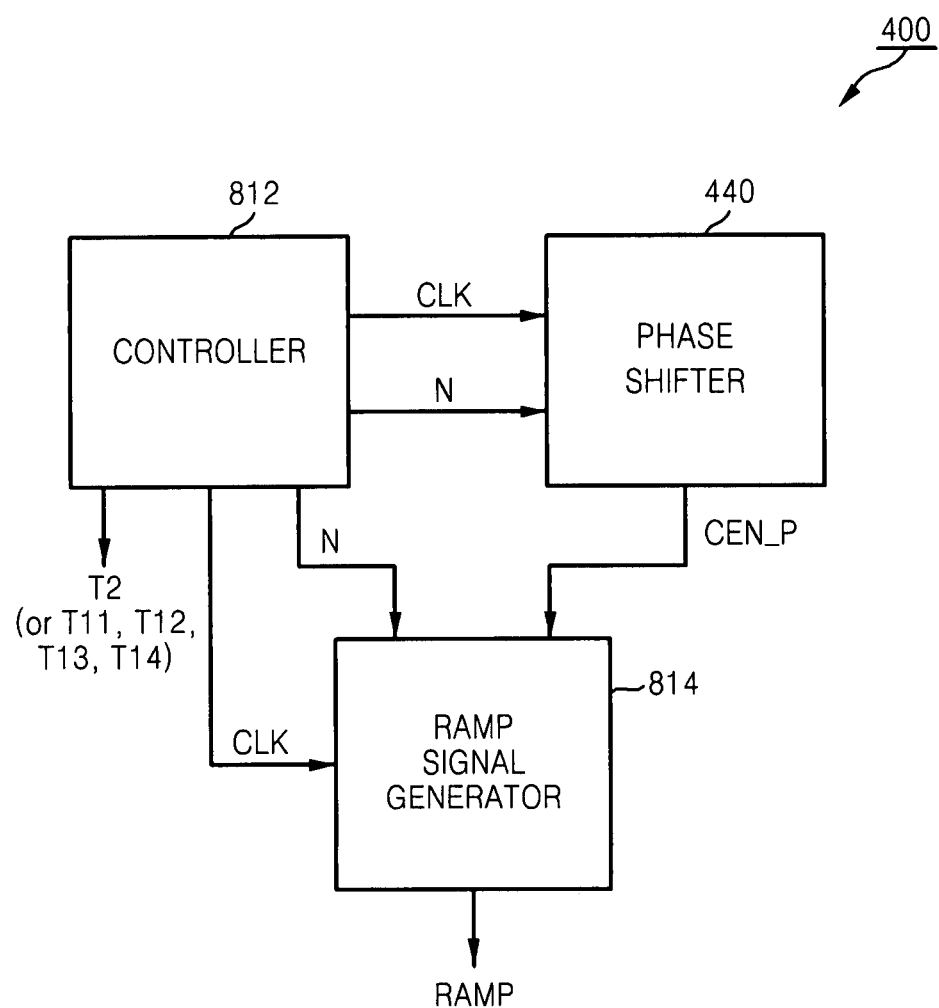
FIG. 10 shows a block diagram of additional components for the CDS and ADC apparatus of FIG. 4 or 6, according to an embodiment of the present invention.

A ramp signal RAMP is applied on a positive input of the comparator 430. Referring to FIGS. 4 and 10, the CDS and ADC apparatus 400 further includes a controller 812, and a ramp signal generator 814 for generating the ramp signal RAMP. The output of the comparator 432 is input to the inverter 434 that generates a comparison signal CDSO2 to the data bus 460. The present invention may also be practiced with the inverter 434 being replaced by a buffer or amplifier.

Figure 5:
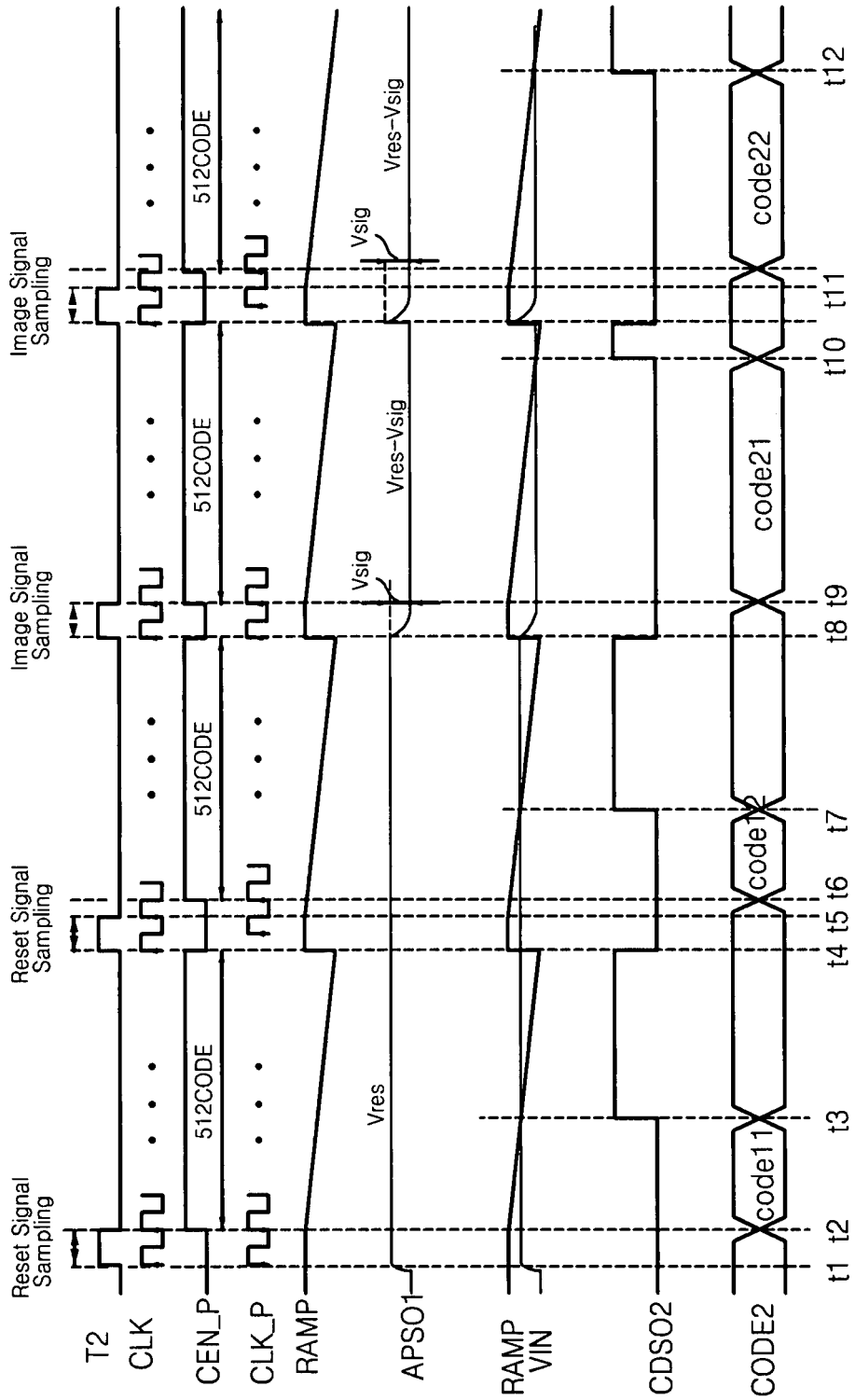
FIG. 5 is a timing diagram of signals during operation of the CDS and ADC apparatus of FIG. 4, according to an embodiment of the present invention.
Figure 11:
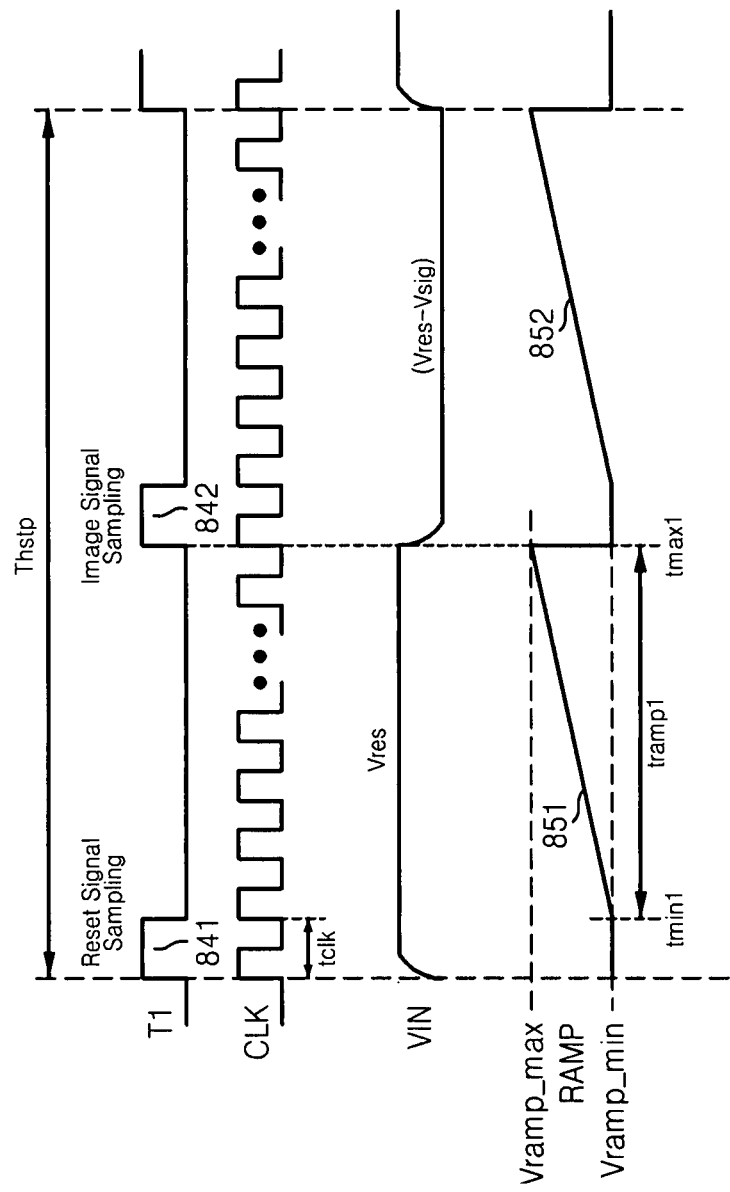
FIG. 11 illustrates a timing diagram of signals during operation with single sampling of the reset and image signals during a horizontal scan time period by the CDS and ADC apparatus of FIG. 2, according to the prior art.
Figure 12:
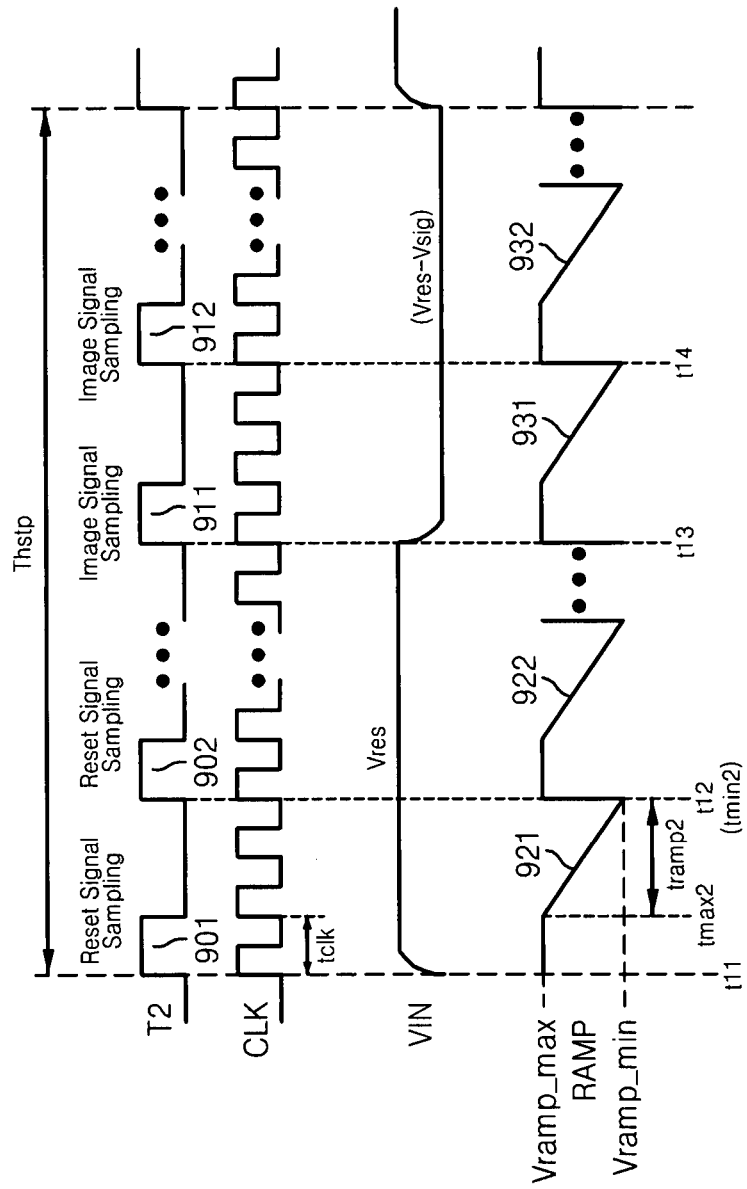
FIG. 12 illustrates a timing diagram of signals during operation with multiple samplings of the reset and image signals during a horizontal scan time period by the CDS and ADC apparatus of FIG. 4 or 6, according to an embodiment of the present invention.

The CDS and ADC apparatus 400 operates according to a flow-chart of FIG. 13 and timing diagrams of FIGS. 5, 11, and 12. The CDS and ADC apparatus 400 operates to perform N reset signal samplings and N image signal samplings, with N>1, during a horizontal scan time period of the image sensor 800. The horizontal scan time period refers to the time period allotted for processing pixel signals from one row of pixels in the pixel array 806. The operation of the CDS and ADC apparatus 400 is now described with reference to FIGS. 4, 5, 10, 11, 12, and 13.

Referring to the timing diagram of FIG. 5, operation of the CDS and ADC apparatus 400 is synchronized to an original clock signal CLK that is generated by the controller 812 according to an embodiment of the present invention. Alternatively, the present invention may be practiced with the controller 812 being part of the timing control circuit 802 that provides the original clock signal CLK within the image sensor 800.

FIG. 5 shows a timing diagram for the example of N=2 reset signal samplings and N=2 image signal samplings during a horizontal scan time period of the image sensor 800. The horizontal scan time period refers to the time allowed for processing a row of pixels in the pixel array 806 of the image sensor 800. Thus, one unit pixel of a selected row is outputting a reset signal and an image signal to be processed by the CDS and ADC apparatus 400 according to the timing diagram of FIG. 5 during a horizontal scan time period.

Initially, the controller 812 sets i=1 (step S941 of FIG. 13) and performs an i-th (i.e., first) reset signal sampling by activating the T2 control signal to close the switch S1 from time point t1 to time point t2 (step S942 of FIG. 13). Each reset signal sampling is for one cycle of the original clock signal CLK according to an embodiment of the present invention. The sampled input voltage VIN reaches a reset voltage Vres for a reset signal output from the unit pixel at the end of such reset signal sampling.

The phase sifter 440 generates an enable signal CEN_P and a modified clock signal CLK_P from the original clock signal CLK. The modified clock signal CLK_P is generated to have a phase shift of $(i-1)*360°/N$. Thus, for the first reset signal sampling, the modified clock signal CLK_P has zero phase shift from the original clock signal CLK.

The enable signal CEN_P is activated at time point t2 after the first reset signal sampling. At activation of the enable signal CEN_P, the code generator 450 begins to count the (rising and/or falling) edges of the modified clock signal CLK_P that has zero phase shift from the original clock signal CLK. The code generator 450 counts according to a gray code sequence in one embodiment of the present invention. The present invention may be practiced with the code generator 450 counting the rising and/or falling edges of the modified clock signal CLK_P.

Also at the activation of the enable signal CEN_P, the ramp signal RAMP from the ramp signal generator 814 begins an i-th (i.e., first) ramp portion. In FIG. 5, the ramp signal begins to ramp downward beginning at the time point t2.

Figure 1:
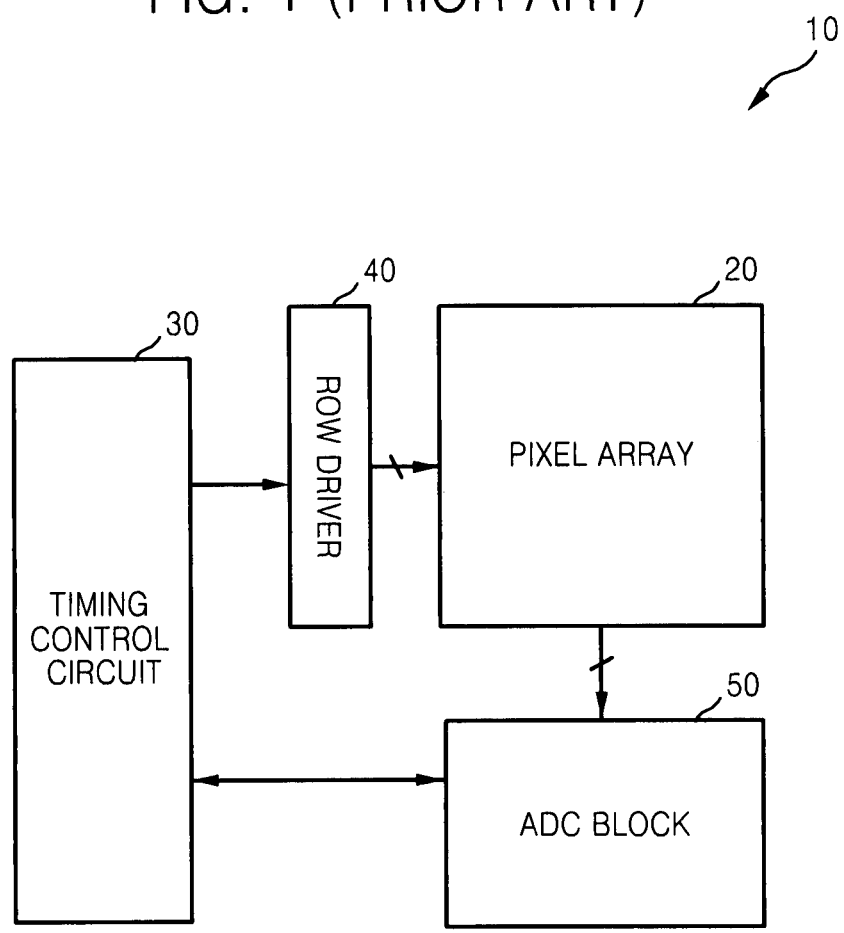
FIG. 1 is a block diagram of a conventional CIS.
Figure 2:
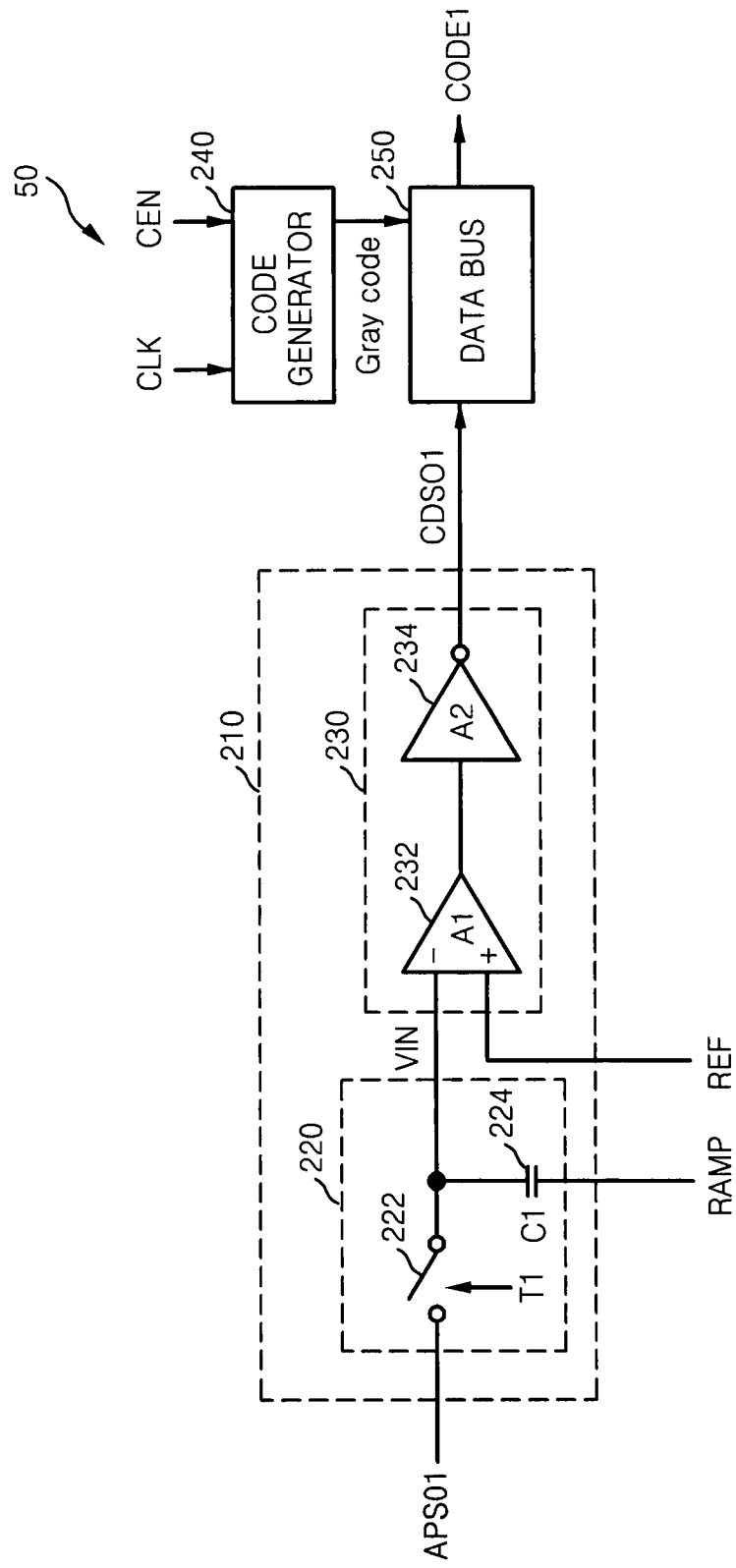
FIG. 2 is a block diagram of an ADC block in FIG. 1, according to the prior art.
Figure 3:
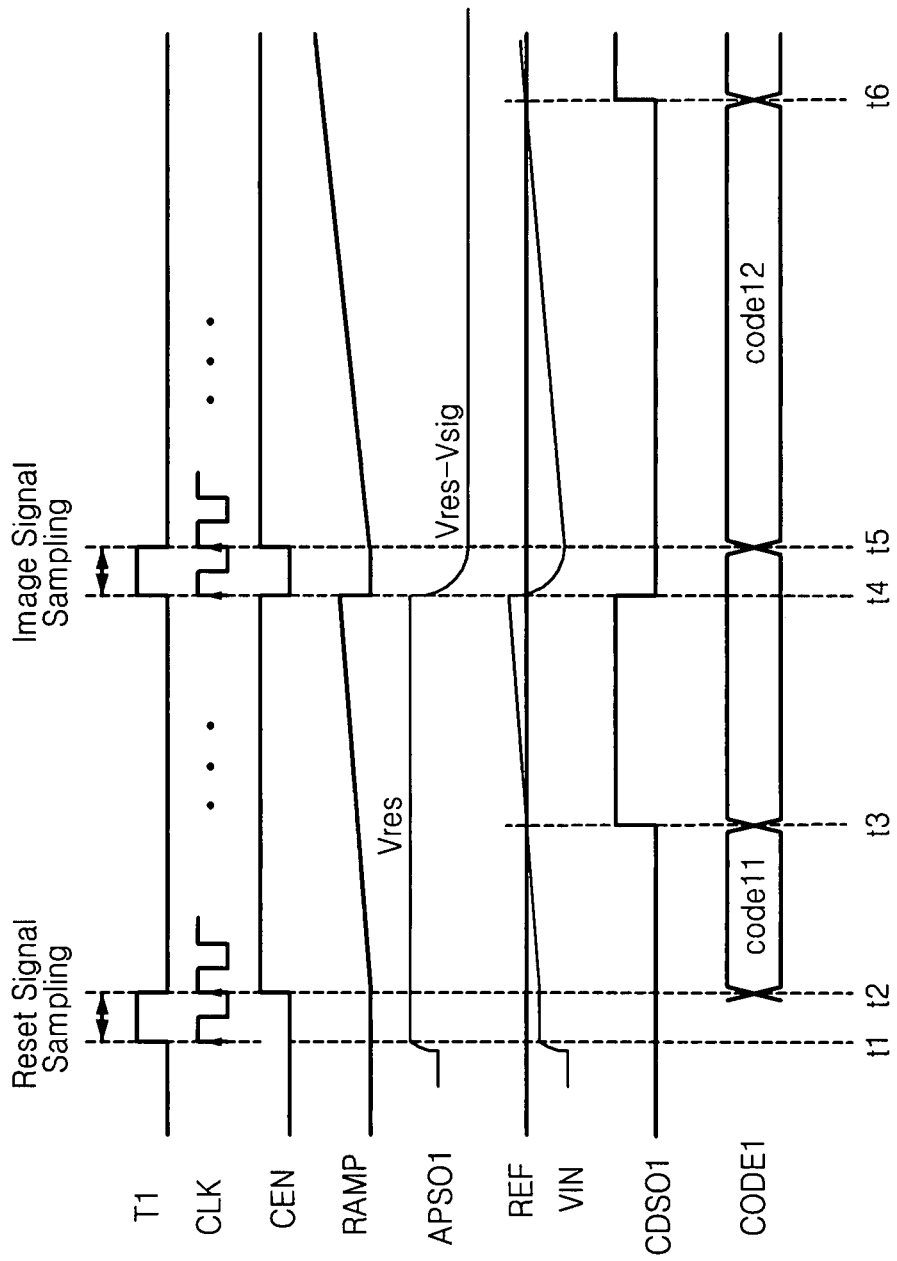
FIG. 3 is a timing diagram of signals during operation of the ADC block of FIG. 2, according to the prior art.

FIG. 11 shows a timing diagram of signals during operation of the ADC block 50 of FIG. 2. In the ADC block 50 of the prior art, just one reset signal sampling 841 and one image signal sampling 842 are performed during one horizontal scan time period Thstp. In FIG. 11, each of the reset signal sampling 841 and the image signal sampling 842 is performed during one cycle tclk of the original clock signal CLK of the image sensor 10.

In FIG. 11, from the reset signal sampling 841, the comparator input voltage VIN is sampled to the reset signal which is at the reset voltage Vres. After the reset signal sampling 841, the ramp signal RAMP begins to ramp up in a first ramp portion 851 for correlated double sampling in the ADC block 50 of FIG. 2. Similarly, from the image signal sampling 842, the comparator input voltage VIN is sampled to the image signal which is at a voltage of (Vres−Vsig) with Vsig indicating the amount of light received at the unit pixel. After the image signal sampling 842, the ramp signal RAMP begins to ramp up in a second ramp portion 852 for correlated double sampling in the ADC block 50 of FIG. 2.

In FIG. 11, the ramp signal RAMP has the two ramp portions 851 and 852 since the reset signal sampling and the image signal sampling are each performed just one time during the horizontal scan time period Thstp. The first half of the horizontal scan time period Thstp is used for the one reset signal sampling 841, and second half of the horizontal scan time period Thstp is used for the one image signal sampling 842.

Thus, each of the ramping portions 851 and 852 has a slope of (Vramp_max−Vramp_min)/(tmax1−tmin1) with (tmax1−tmin1)≈(½*Thstp−tclk). Vramp_max is a maximum value of the ramping portions 851 and 852 occurring for example at time point tmax1. Vramp_min is a minimum value of the ramping portions 851 and 852 occurring for example at time point tmin1.

In contrast, FIG. 12 shows a timing diagram of signals during operation of the CDS and ADC apparatus 400 of FIG. 4. In FIG. 12, N reset signal samplings 901, 902, and ... and N image signal samplings 911, 912, and ... with N>1 are performed during the horizontal scan time period Thstp. The horizontal scan time period Thstp is designed for processing pixel signals from each row of an image sensor and is substantially the same in FIGS. 11 and 12. The N reset signal samplings 901, 902, and ... are performed during a first half of the horizontal scan time period Thstp, and the N image signal samplings 911, 912, and ... are performed during a second half of the horizontal scan time period Thstp, in one embodiment of the present invention.

Further referring to FIG. 12, a respective ramp portion is generated after each of the reset signal samplings and each of the image signal samplings. Thus, corresponding ramp portions 921, 922, 931, and 932 are generated after the reset and images signal samplings 901, 902, 911, and 912, respectively. Thus, the slope of each of the ramp portions 921, 922, 931, and 932 is increased according to N. For N reset signal samplings and N image signal samplings during the horizontal scan time period Thstp, the slope of each of the ramp portions 921, 922, 931, and 932 is about (Vramp_max−Vramp_min)/(tmax2−tmin2) with (tmax2−tmin2)≈[Thstp/(2*N)−tclk].

Vramp_max is a maximum value of the ramping portions 921, 922, 931, and 932 occurring for example at time point tmax2. Vramp_min is a minimum value of the ramping portions 921, 922, 931, and 932 occurring for example at time point tmin2. The Vramp_max and Vramp_min would be substantially the same in FIGS. 11 and 12. Thus, the slope of each of the ramping portions 921, 922, 931, and 932 is increased depending on N from the slope of each of the ramping portions 851 and 852 of FIG. 11. FIG. 5 shows an example for the case of N=2 with each of the ramp portions of the ramp signal RAMP having a correspondingly increased slope for such multiple samplings.

At the activation of the enable signal CEN_P at time point t2, the code generator 450 has begun to count edges of the modified clock signal CLK_P as the ramp signal RAMP has also begun to ramp downward. Meanwhile, the comparator 432 is comparing the sampled input voltage VIN with the ramp signal RAMP that is ramping down. Eventually, the ramp signal RAMP becomes less than the sampled input voltage VIN which is at the reset voltage level Vres at time point t3 when the comparison signal CDSO2 makes a transition from the logic low state "0" to the logic high state "1" (step S943 of FIG. 13).

The data bus 460 latches the digital code at the code generator 450 at such time point t3 as a first reset digital code (code11 in FIG. 5) corresponding to the first reset signal sampling during time t1 to t2 (step S944 of FIG. 13). Such a first reset digital code corresponds to the count of edges of the modified clock signal CLK_P by the code generator 450 during time period t2 to t3.

Subsequently referring to FIGS. 4, 5, and 13, i=i+1 (step S945 of FIG. 13), and if i is still less than N (step S946 of FIG. 13), the next reset signal sampling (i.e., a second reset signal sampling) is performed after the end of the first ramp portion of the ramp signal RAMP reaches Vramp_min at time point t4. Thus, steps S941, S942, S943, S944, S945, and S946 of FIG. 13 are repeated for another reset signal sampling performed during time period t4 to t5.

In this manner, the data bus 460 latches a second reset digital code (code12 in FIG. 5) corresponding to such second reset signal sampling that corresponds to the count of edges of the modified clock signal CLK_P by the code generator 450 during time period t6 to t7. In addition, note that the phase of the modified clock signal CLK_P for the second reset signal sampling is shifted from the original clock signal CLK by 180°=(i−1)*360°/N, with i=2 and N=2 in the example of FIG. 5.

Further referring to FIGS. 4, 5, and 13, when i>N (step S946 of FIG. 13), the N reset signal samplings are done. The data bus 460 sums the N reset digital codes (code11+code12) generated for the N reset signal samplings to generate a final reset digital code (step S947 of FIG. 13).

Subsequently, the N image signal samplings are started with the controller 812 setting i=1 (step S948 of FIG. 13) and performing an i-th (i.e., first) image signal sampling by activating the T2 control signal to close the switch S1 from time point t8 to time point t9 (step S949 of FIG. 13). Each image signal sampling is for one cycle of the original clock signal CLK according to an embodiment of the present invention. The sampled input voltage VIN reaches an image voltage (Vres−Vsig) for an image signal output from the unit pixel at the end of such image signal sampling.

The phase sifter 440 generates the enable signal CEN_P and the modified clock signal CLK_P with a phase shift of (i−1)*360°/N. Thus, for the first image signal sampling, the modified clock signal CLK_P has zero phase shift from the original clock signal CLK. The enable signal CEN_P is activated at time point t9 after the first image signal sampling.

At activation of the enable signal CEN_P, the code generator 450 begins to count the edges of the modified clock signal CLK_P that has zero phase shift from the original clock signal CLK. Also at the activation of the enable signal CEN_P, the ramp signal RAMP from the ramp signal generator 814 begins an i-th (i.e., first) ramp portion with the increased down-ward slope similar to the ramp portions for the reset signal samplings (step S950 of FIG. 13).

Meanwhile, the comparator 432 is comparing the sampled input voltage VIN with the ramp signal RAMP that is ramping down. Eventually, the ramp signal RAMP becomes less than the sampled input voltage VIN at time point t10 when the comparison signal CDSO2 makes a transition from the logic low state "0" to the logic high state "1" (step S950 of FIG. 13).

The data bus 460 latches the digital code at the code generator 450 at such time point t10 as a first image digital code (code21 in FIG. 5) corresponding to the first image signal sampling of time period t8 to t9 (step S951 of FIG. 13). Such a first image digital code corresponds to the count of edges of the modified clock signal CLK_P by the code generator 450 during time period t9 to t10.

Subsequently referring to FIGS. 4, 5, and 13, i=i+1 (step S952 of FIG. 13), and if i is still less than N (step S953 of FIG. 13), the next image signal sampling (i.e., a second image signal sampling) is performed. Thus, steps S948, S949, S950, S951, S952, and S953 of FIG. 13 are repeated for the second image signal sampling. In this manner, the data bus 460 latches a second image digital code (code22 in FIG. 5) corresponding to such second image signal sampling that corresponds to the count of edges of the modified clock signal CLK_P by the code generator 450. In addition, note that the phase of the modified clock signal CLK_P for the second image signal sampling is shifted from the original clock signal CLK by 180°=(i−1)*360°/N, with i=2 and N=2 in the example of FIG. 5.

Further referring to FIGS. 4, 5, and 13, when i>N (step S953 of FIG. 13), the N image signal samplings are done. The data bus 460 sums the N image digital codes (code21+code22) generated for the N image signal samplings to generate a final image digital code (step S954 of FIG. 13). Additionally, the data bus 460 subtracts the final image digital code determined in step S954 from the final reset digital code determined in step S947 to generate a final digital code CODE2 (step S955 of FIG. 13) corresponding to the image sensed by the unit pixel coupled to the CDS and ADC apparatus 400 during the current horizontal scan time period.

Using such a difference between the final reset digital code and the final image digital code results in correlated double sampling for eliminating fixed pattern noise. In addition, by summing the digital codes from the N reset signal samplings and the N image signal samplings with the successive phase shift of the modified clock signal CLK_P for such successive N multiple samplings, higher resolution of analog-to-digital conversion results even for lower resolution of each of the samplings. For example for N=2 in FIG. 5, if each sampling is for a resolution of 512 possible levels, the final resolution from summing the N=2 samplings is for 1024 possible levels.

Thus, a higher final resolution of analog to digital conversion may be achieved even with lower resolution of analog to digital conversion of each of the N samplings in FIG. 5. In addition, such multiple N=2 samplings reduces the random noise by $1/\sqrt{2}$. Generally, the random noise may be reduced by 1/sqrt(N), with sqrt(N) being the square root of N, for such N reset signal samplings and N image signal samplings during the horizontal scan time period.

The present invention of FIGS. 4 and 5 has been described for multiple reset signal samplings and image signal samplings. However, the present invention may be used for multiple samplings of any other types of pixel signals from the unit pixel coupled to the CDS and ADC apparatus 400 during a horizontal scan time period.

Figure 6:
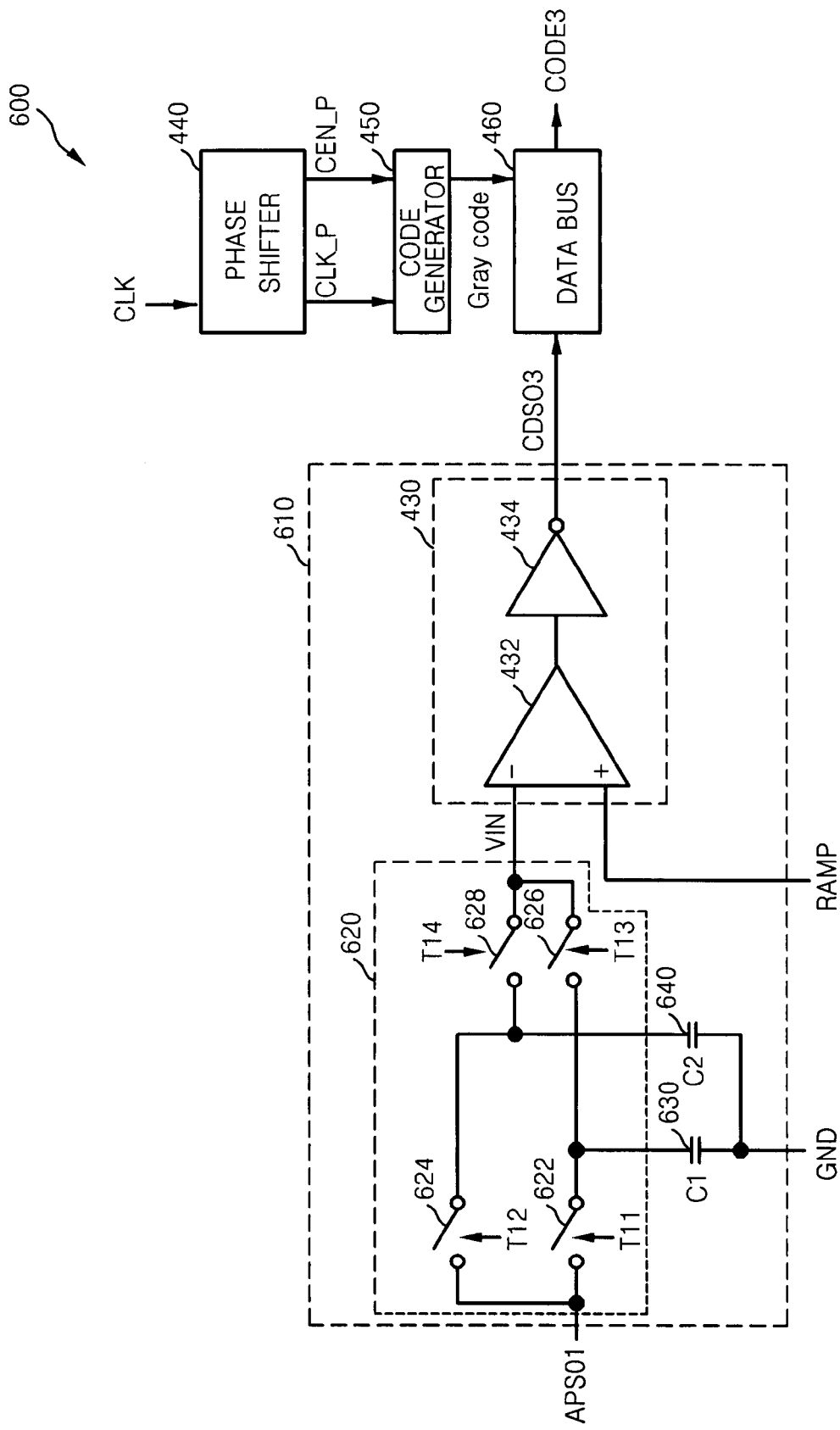
FIG. 6 is a block diagram of a CDS and ADC apparatus having multiple sampling capacitors, according to another embodiment of the present invention.
Figure 7:
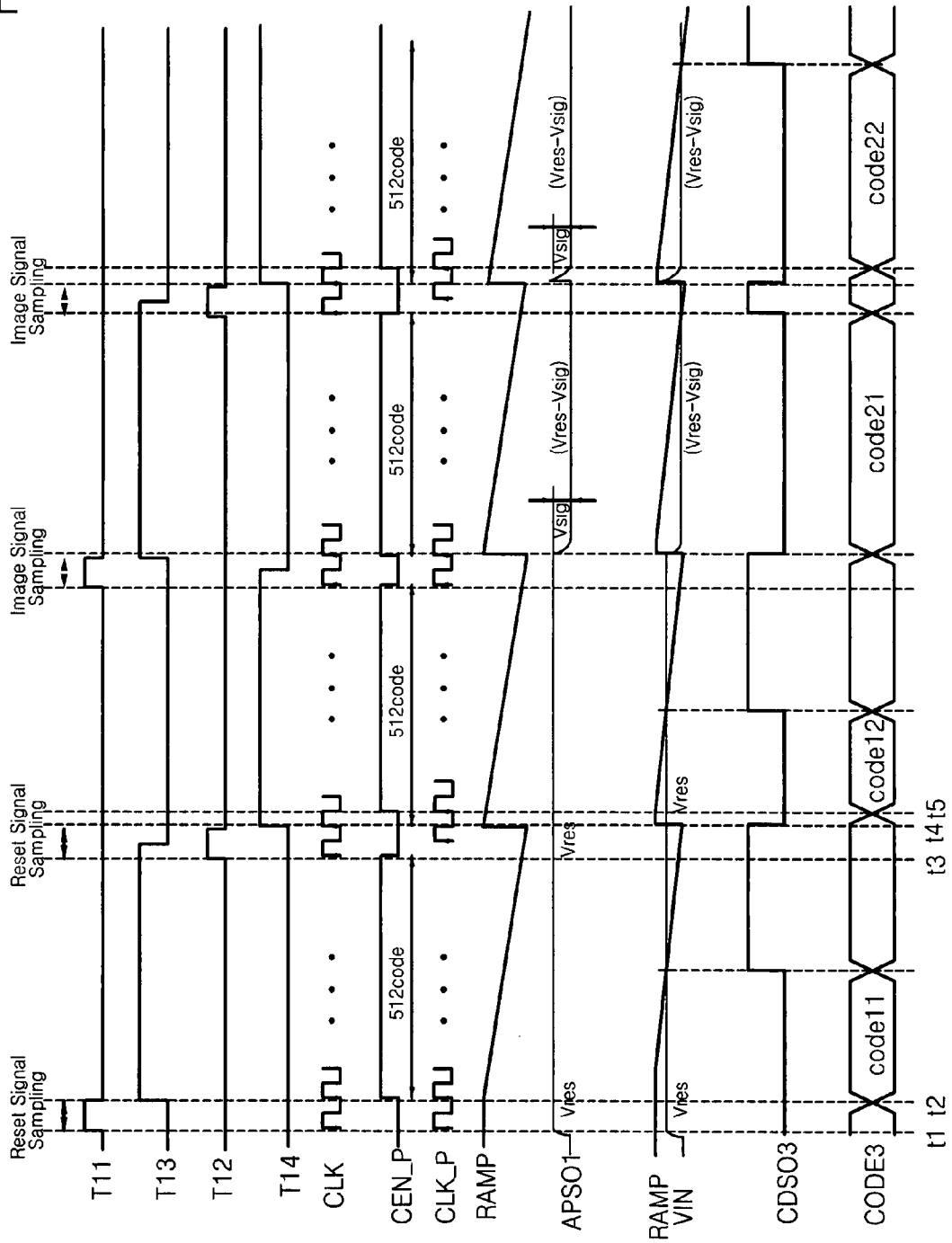
FIG. 7 is a timing diagram of signals during operation of the CDS and ADC apparatus of FIG. 6, according to an embodiment of the present invention.

FIG. 6 is a block diagram of a CDS and ADC apparatus 600 according to another embodiment of the present invention. Elements having the same reference number in FIGS. 4 and 6 refer to elements having similar structure and/or function. FIG. 7 is a timing diagram of signals during operation of the CDS and ADC apparatus 600 of FIG. 6 that performs N=2 reset signal samplings and N=2 image signal samplings during a horizontal scan time period.

Comparing FIGS. 4 and 6, the CDS and ADC apparatus 600 has a modified CDS unit 610 with a switching unit 620 for using first and second storing units 630 and 640 that are capacitors C1 and C2, respectively, for sampling the pixel signals (i.e., the reset and image signals) from the unit pixel coupled to the CDS and ADC apparatus 600 during the horizontal scan time period. The switching unit 620 includes a first switch 622, a second switch 624, a third switch 626, and a fourth switch 628 that operate in response to first, second, third, and fourth control signals T11, T12, T13, and T14, respectively.

The first and third switches 622 and 626 are coupled in series between the unit pixel generating the pixel signal APS01 and the negative input of the comparator 432. The second and fourth switches 624 and 628 are coupled in series between the unit pixel generating the pixel signal APS01 and the negative input of the comparator 432.

A first terminal of the capacitor C1 is coupled to the node between the first and third switches 622 and 626, and a second terminal of the capacitor C1 is coupled to the ground node GND. A first terminal of the capacitor C2 is coupled to the node between the second and fourth switches 624 and 628, and a second terminal of the capacitor C2 is coupled to the ground node GND.

Referring to FIGS. 6 and 7, the first switch 622 in response to the activated first control signal T11 is closed to sample the reset signal Vres during the time period t1 to t2 for storage of the sampled reset signal Vres in the first capacitor 630. After time point t2, the first switch 622 is opened, and the third switch 626 in response to an activated third control signal T13 is closed to transfer the sampled reset signal Vres from the first capacitor 630 to the negative input of the comparator 432. Thereafter, analog to digital conversion with correlated double sampling is performed for such first reset signal sampling in FIG. 7 similar to FIG. 5.

Thereafter at time point t3, the second switch 624 in response to an activated second control signal T12 is closed for sampling the reset signal Vres that is stored into the second capacitor 640. The ramp signal RAMP may continue to ramp down at time point t3 since the fourth switch T14 remains opened to isolate the second sampled reset signal stored in the second capacitor 640. Thus, the second capacitor 640 stores in advance the second sampling of the reset signal Vres as sampled during time period t3 to t4. During such a time period, the first sampling of the reset signal as stored in the first capacitor C1 and the ramp signal RAMP may continue to be compared.

However, the third switch 626 is opened before the time point t4 when the fourth switch 628 in response to an activated fourth control signal T14 is closed to transfer the second sampled reset signal Vres from the second capacitor 640 to the negative input of the comparator 432. Thus, the CDS and ADC apparatus 600 of FIG. 6 takes less time for the N samplings of the reset signal than the CDS and ADC apparatus 400 of FIG. 4.

Similarly, such over-lap is allowed between a second sampling of the image signal with the analog to digital conversion with correlated double sampling of a first sampling of the image signal. Thus, the CDS and ADC apparatus 600 of FIG. 6 takes less time for the N samplings of the image signal than the CDS and ADC apparatus 400 of FIG. 4.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention is limited only as defined in the following claims and equivalents thereof.

What is claimed is:

1. A method for CDS (correlated double sampling) and ADC (analog to digital conversion) in an image sensor, comprising:
    sampling a pixel signal from a given pixel to generate a respective sampled signal N-times to perform N reset signal samplings and sampling another pixel signal from the given pixel to generate another respective sampled signal N-times to perform N image signal samplings, with N>1 within a horizontal scan time period of the image sensor;
    generating a ramp signal with a respective ramping portion for each respective sampled signal;
    comparing each respective sampled signal with a respective ramping portion to generate a respective comparison signal;
    generating a respective digital code from each respective comparison signal;
    counting a respective clock signal from the respective ramping portion beginning to ramp until a logical transition of the respective comparison signal to generate the respective digital code for each respective sampled signal, wherein the respective clock signal for each respective sampled signal generated N times forms N respective clock signals, and wherein each respective sampled signal generated N times forms N respective sampled signals; and
    generating the respective clock signals to be successively phase-shifted by 360°/N for the N respective sampled signals.

2. The method of claim 1, wherein each respective ramping portion has a slope that is increased according to N from an initial slope of a predetermined ramp signal designed for sampling the pixel signal one-time during the horizontal scan time period.

3. The method of claim 1, further comprising:
    summing the N respective digital codes to generate a final digital code corresponding to the pixel signal.

4. The method of claim 1, further comprising:
    generating the respective ramp signal with a respective ramping portion for each of the N other respective sampled signals;
    comparing each of the other respective sampled signals with a respective ramping portion to generate a respective comparison signal; and
    generating a respective digital code from each respective comparison signal for each of the N other respective sampled signals.

5. The method of claim 4, wherein the pixel signal is a reset signal generated by the given pixel, and wherein the other pixel signal is an image signal generated by the given pixel, and wherein the image sensor is a CMOS (complementary metal oxide semiconductor) image sensor.

6. The method of claim 5, further comprising:
    summing the respective digital codes for the N respective sampled signals to generate a final reset digital code corresponding to the reset signal;
    summing the respective digital codes for the N other respective sampled signals to generate a final image digital code corresponding to the image signal; and
    determining a difference between the final image digital code and the final reset digital code for correlated double sampling.

7. The method of claim 4, further comprising:
    sampling the pixel signal N-times during a first half of the horizontal scan time period; and
    sampling the other pixel signal N-times during a second half of the horizontal scan time period.

8. The method of claim 1, further comprising:
    using alternately a plurality of capacitors for each of the N samplings of the pixel signal;
    wherein one of the N samplings of the pixel signal with one of the capacitors overlaps in time with comparing a sampled pixel signal of another of the capacitors with a respective ramp portion.

9. A CDS (correlated double sampling) and ADC (analog to digital converter) apparatus in an image sensor, the CDS and ADC apparatus comprising:
    a sampling unit for sampling a pixel signal from a given pixel to generate a respective sampled signal N-times to perform N reset signal samplings and for sampling another pixel signal from the given pixel to generate another respective sampled signal N-times to perform N image signal samplings, with N>1 within a horizontal scan time period of the image sensor;
    a ramp signal generator for generating a ramp signal with a respective ramping portion for each respective sampled signal;
    a comparison unit for comparing each respective sampled signal with a respective ramping portion to generate a respective comparison signal;
    a code generator for generating a respective digital code from each respective comparison signal,
    wherein the code generator counts a respective clock signal from the respective ramping portion beginning to ramp until a logic transition of the respective comparison signal to generate the respective digital code for each respective sampled signal, wherein the respective clock signal for each respective sampled signal generated N times forms N respective clock signals, and wherein each respective sampled signal generated N times forms N respective sampled signals; and
    a phase shifter for generating the N respective clock signals that are successively phase-shifted by 360°/N for the N respective sampled signals.

10. The CDS and ADC apparatus of claim 9, wherein each respective ramping portion has a slope that is increased according to N from an initial slope of a predetermined ramp signal designed for sampling the pixel signal one-time during the horizontal scan time period.

11. The CDS and ADC apparatus of claim 9, further comprising:
    a data bus that sums together the N respective digital codes to generate a final digital code corresponding to the pixel signal.

12. The CDS and ADC apparatus of claim 9, wherein the ramp signal generator generates the ramp signal with a respective ramping portion for each of the N other respective sampled signals;
    and wherein the comparison unit compares each of the N other respective sampled signals with a respective ramping portion to generate a respective comparison signal;
    and wherein the code generator generates a respective digital code from each respective comparison signal for each of the N other respective sampled signals.

13. The CDS and ADC apparatus of claim 12, wherein the pixel signal is a reset signal generated by the given pixel, and wherein the other pixel signal is an image signal generated by the given pixel, and wherein the image sensor is a CMOS (complementary metal oxide semiconductor) image sensor.

14. The CDS and ADC apparatus of claim 13, further comprising:
    a data bus that sums the respective digital codes for the N respective sampled signals to generate a final reset digital code corresponding to the reset signal, and that sums the respective digital codes for the N other respective sampled signals to generate a final image digital code corresponding to the image signal, and wherein the data bus determines a difference between the final image digital code and the final reset digital code for correlated double sampling.

15. The CDS and ADC apparatus of claim 12, wherein the pixel signal is sampled N-times during a first half of the horizontal scan time period, and wherein the other pixel signal is sampled N-times during a second half of the horizontal scan time period.

16. The CDS and ADC apparatus of claim 12, further comprising:
    a plurality of capacitors; and
    a switching unit for storing the N samplings of the pixel signal alternately in the plurality of capacitors;
    wherein one of the N samplings of the pixel signal with one of the capacitors overlaps in time with comparing a sampled pixel signal stored in another of the capacitors with a respective ramp portion.

* * * * *